(12) United States Patent
Stier

(10) Patent No.: US 10,093,045 B2
(45) Date of Patent: Oct. 9, 2018

(54) METHOD FOR ENCAPSULATING WITH PLASTIC

(71) Applicant: Marquardt GmbH, Rietheim-Weilheim (DE)

(72) Inventor: Christoph Stier, Balgheim (DE)

(73) Assignee: Marquardt GmbH, Rietheim-Weilheim (DE)

( * ) Notice: Subject to any disclaimer, the term of this patent is extended or adjusted under 35 U.S.C. 154(b) by 73 days.

(21) Appl. No.: 15/040,320

(22) Filed: Feb. 10, 2016

(65) Prior Publication Data

US 2016/0243736 A1   Aug. 25, 2016

(30) Foreign Application Priority Data

Feb. 12, 2015   (DE) .................. 10 2015 001 642

(51) Int. Cl.
*B29C 45/00* (2006.01)
*B29C 45/14* (2006.01)

(52) U.S. Cl.
CPC .... *B29C 45/0025* (2013.01); *B29C 45/14073* (2013.01); *B29C 45/14819* (2013.01)

(58) Field of Classification Search
CPC .................................................. B29C 45/025
USPC .......................................................... 428/76
See application file for complete search history.

(56) References Cited

FOREIGN PATENT DOCUMENTS

| DE | 101 55 537 A1 | 11/2002 | |
| DE | 10155537 A1 * | 11/2002 | ....... B29C 45/14073 |
| DE | 103 26 794 A1 | 1/2004 | |
| DE | 10 2004 050 141 A1 | 4/2006 | |

OTHER PUBLICATIONS

German Search Report (Application No. 10 2015 001 642.3) dated Sep. 15, 2015.

* cited by examiner

*Primary Examiner* — Brent T O'Hern
(74) *Attorney, Agent, or Firm* — Burr & Brown, PLLC

(57) ABSTRACT

The invention relates to a method for encapsulating an element with a body of plastic. The element is placed into a cavity in an injection mold and fixed therein by means of a movable retaining pin. Then the plastic is injected into the cavity. Subsequently, the retaining pin is moved away from the element after filling of the cavity and while the plastic is still in a plastic state so that plastic can subsequently flow into the volume vacated by the retaining pin, to produce a kind of weld line in the region of the fixing on the body. Then, the retaining pin is moved back in the direction of the element while the plastic that subsequently flowed into the volume is still in a plastic state so that a kind of compression of the plastic takes place in the region of the fixing on the body.

16 Claims, 8 Drawing Sheets

METHOD FOR ENCAPSULATING WITH PLASTIC

BACKGROUND OF THE INVENTION

1. Field of the Invention

The invention relates to a method for encapsulating an element with a body of plastic.

2. Description of the Related Art

The method according to the invention can be used in particular for producing a so-called electrical component carrier. An electrical component carrier is a carrier element for receiving electrical and/or electronic components, with electrical conductor tracks for the electrical connection of the components being arranged in and/or on the carrier element. The electrical component carrier is usually produced by encapsulating the structure for the conductor tracks with plastic in an injection-molding machine.

In a method for encapsulating an element with a body of plastic, the element is placed into an injection mold that is located in the injection-molding machine and has a cavity and is fixed in the cavity by means of a movable retaining pin. Then, the plastic is injected into the cavity. After filling of the cavity, the retaining pin is moved away from the element while the plastic is still in a plastic state, in such a way that plastic can subsequently flow into the volume vacated by the retaining pin in order likewise to fill the region of the fixing of the element. Generally, a kind of joint line is thereby produced on the body in the region of the fixing of the element.

It has been found that permeable joint lines often occur on the body, with the result that harmful substances can enter the body there and impair the element that is located in the body. Such a joint line 12 can be seen in FIG. 10, which clearly shows the permeable location 15 on the body 2 in the region of the joint line 12. In order to counteract such impairments for the embedded element 4, the body is therefore subsequently potted with a synthetic resin in order to achieve a corresponding impermeability at the joint lines. However, the potting is an additional, cost-causing working step.

SUMMARY OF THE INVENTION

The invention is based on the object of further developing the encapsulating method in such a way that the impermeability in the region of the fixing of the element and/or at the joint line is improved. It is particularly intended to make it possible in this way to dispense with the additional potting operation that was previously common practice.

In the method according to the invention, the retaining pin is subsequently moved back again in the direction of the element while the plastic that has subsequently flowed into the volume is still in a plastic state. In particular, this moving back of the retaining pin is performed in such a way that a kind of compression of the plastic in the region of the fixing on the body takes place.

During the subsequent flowing of the plastic into the volume vacated by the retaining pin, a kind of joint line can be produced in the region of the fixing on the body. As provided by the encapsulating method according to the invention, the plastic in the region of the joint line may be compressed during the moving back of the retaining pin in the direction of the element. This particularly allows permeable locations at the joint line with respect to the element to be closed.

In a further refinement of the method, the length of travel for the movement of the retaining pin back in the direction of the element can be chosen to be less than the length of travel for the movement of the retaining pin away from the element. In particular, it is expedient in this respect that the movement back of the retaining pin is ended before and/or when the region of the fixing on the body is reached. Such a measure ensures reliable closing of the joint line, and consequently its impermeability.

The element may be a metal part. The element may be of a flat form, for example it may be a metal sheet. Preferably, the element may form a conductor track, which serves for the electrical connection of components located on the body. In particular, these conductor tracks may be produced in the manner of a leadframe of metal sheet, this leadframe being encapsulated with plastic to form an electrical component carrier. The plastic may be a thermoplastic.

The retaining pin may expediently have a tip for the fixing of the element. The element may be provided with a receptacle corresponding to the tip. Furthermore, the receptacle may be arranged in and/or at the region of the fixing on the body. The tip for fixing the element may engage in the receptacle simply in an interlocking and/or frictionally engaging manner.

In a further refinement, the retaining pin may be movably guided in the injection mold, thereby making precise fixing of the element in the cavity possible. The guidance may be devised in such a way that the retaining pin can be moved into the cavity and/or out of the cavity. For this purpose, the retaining pin may expediently be moved by means of a drive, for which in turn a corresponding control may be provided. For a low-cost and reliable drive, it may be motorized, electromotive, electromagnetic, pneumatic, hydraulic or the like.

The invention also provides a subassembly which comprises a body of plastic and at least one element embedded in the body by encapsulation. The element is fixed during the encapsulation with the plastic by means of a movable retaining pin. The plastic that has subsequently flowed into the region of the fixing on the body during and/or after the moving away of the retaining pin is compressed. As a result, a sealing of the subassembly in the region of the fixing on the body is simply achieved, without additional measures being required. The plastic that has subsequently flowed into the region of the fixing on the body may expediently be compressed by moving back of the retaining pin. Such a subassembly can be used in particular as an electrical component carrier.

The following may be stated for a particularly preferred refinement of the invention.

In the production of an electrical component carrier, the conductor tracks must be held in the middle of the cavity of the injection mold during the injecting operation. For this purpose, retaining pins are provided in the injection mold. The subsequent withdrawal of the retaining pins and the then following subsequent flow of the plastic have the effect of producing joint lines, at which potential permeable locations for the electrical component carrier may occur. Therefore, the joint lines must be sealed in compliance with the respective quality requirement, for example IP67. In order to avoid an additional process step for the sealing, it is therefore intended to achieve a media-impermeable embedding of the conductor tracks during the encapsulation with plastic.

For this, a mechanical widening of the injection mold takes place. During the injecting operation, the chamber in the region of the fixing is filled with plastic by withdrawal of the retaining pins. Immediately thereafter, the retaining pins are in turn pushed back a little, the subsequently flowing plastic being compressed. The resultant joint line at which permeable locations with respect to the conductor track can potentially occur, is thereby closed and/or compressed.

This therefore provides a method for a media-impermeable sealing of joint lines during the injection-molding process for an electrical component carrier.

The advantages achieved by the invention are, in particular, that subassemblies on which conductor tracks are encapsulated can be produced without the previously required additional operation of potting the joint lines. Costs in the production of the subassembly are consequently saved. Furthermore, an improvement in the impermeability of the subassembly with respect to the penetration of harmful substances is achieved, accompanied by an increase in quality.

BRIEF DESCRIPTION OF THE DRAWINGS

An exemplary embodiment of the invention with various developments and refinements is explained in more detail below and is represented in the drawings, in which.

DETAILED DESCRIPTION OF THE INVENTION

Figure 1:
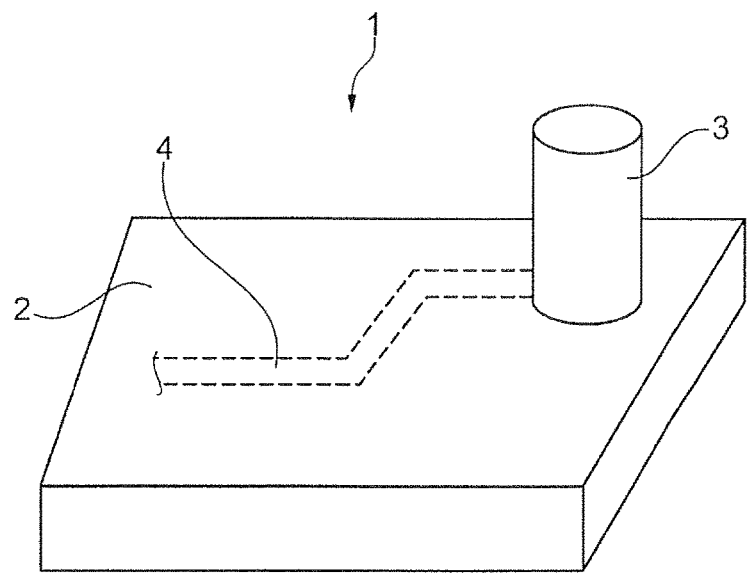
FIG. 1 schematically shows a subassembly in a perspective view.

In FIG. 1, a subassembly 1 in the manner of an electrical component carrier with a body 2 of plastic can be seen, the body 2 serving as a carrier for receiving electrical and/or electronic components 3. Embedded in the body 2 are elements 4, which cannot themselves be seen (represented as dashed lines), are formed as conductor tracks and serve for the electrical connection of the components 3. Such an element 4 is represented by way of example as a single part in FIG. 2. The production of the subassembly 1 takes place by encapsulating the element 4 with the body 2 of plastic with the aid of an injection mold 5 (see FIG. 4) in an injection-molding machine, as represented in more detail in FIG. 4 to FIG. 9.

Figure 4:
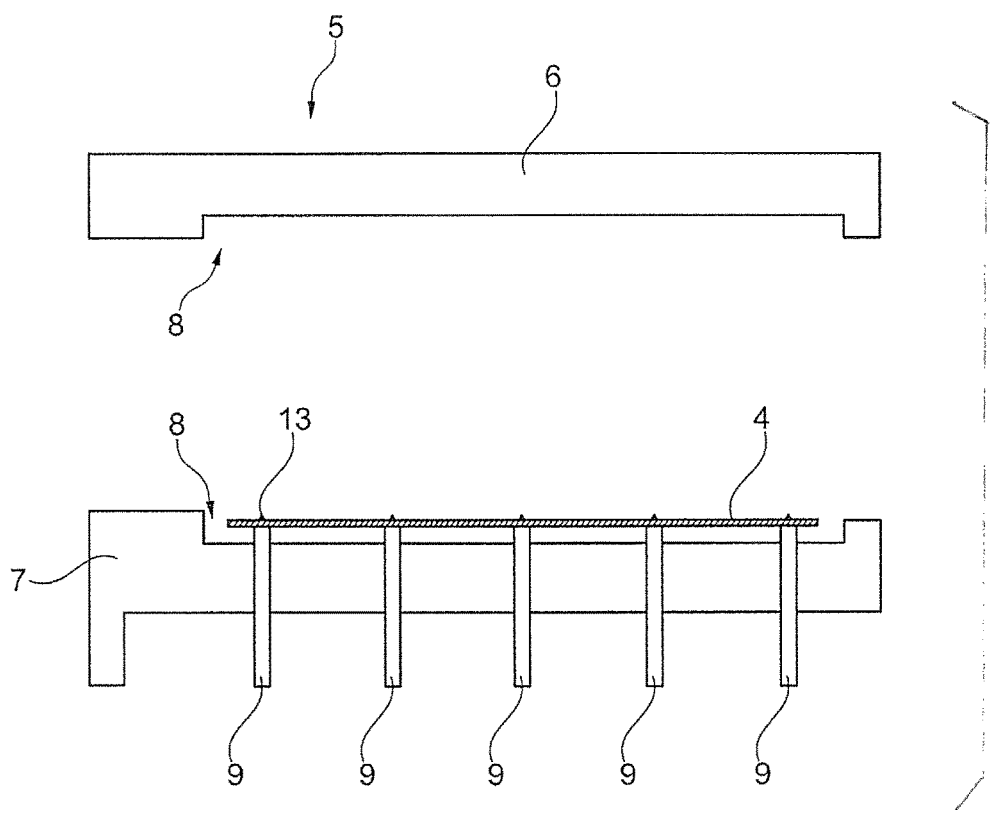
FIG. 4 to FIG. 9 show the injection mold during individual working steps in the encapsulation of the element from FIG. 2.
Figure 5:
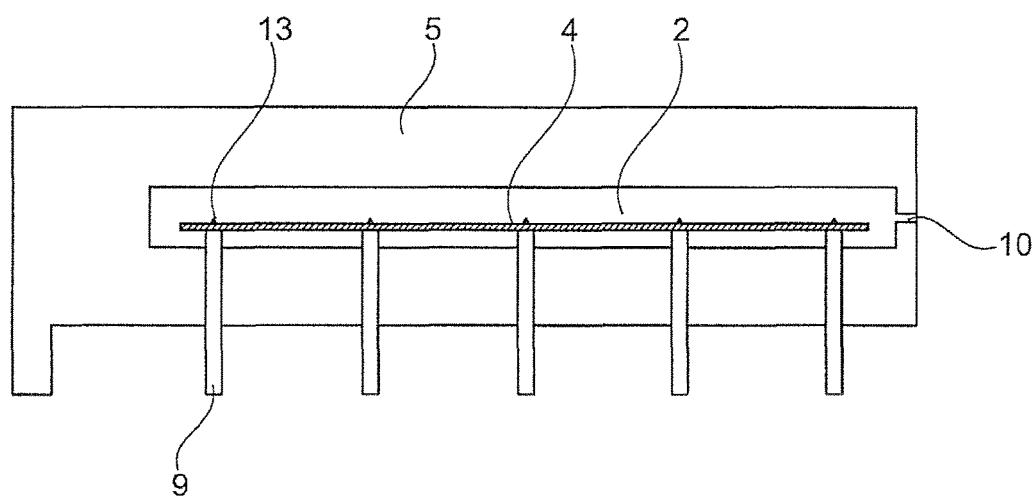
Figure 6:
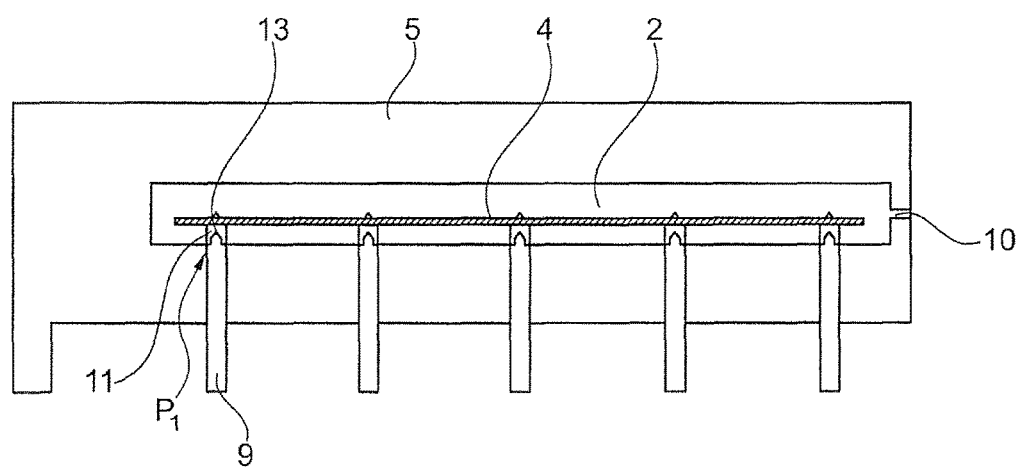
Figure 7:
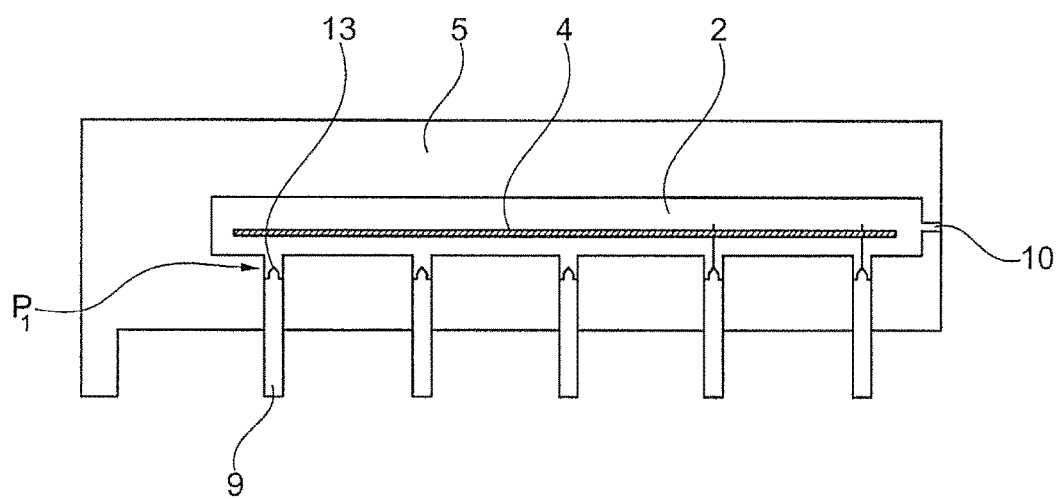
Figure 8:
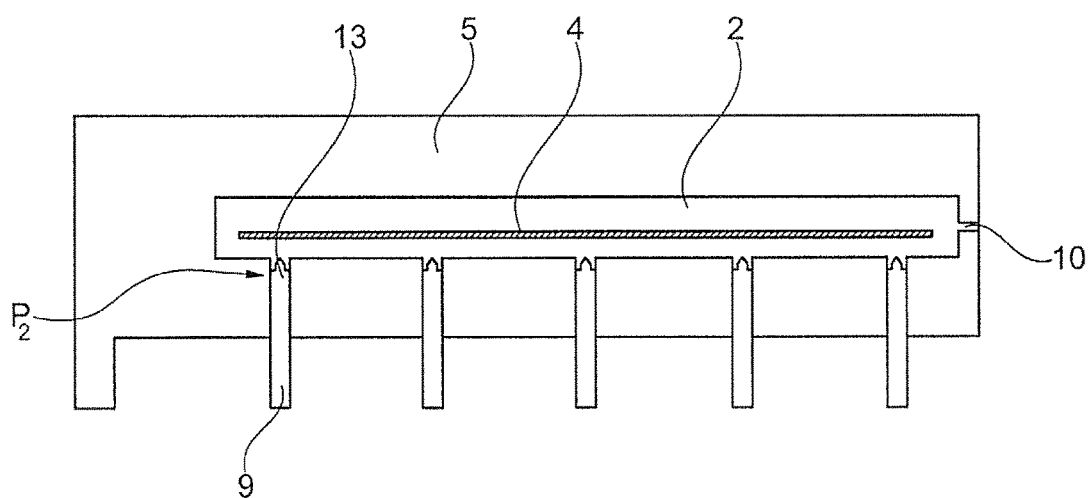
Figure 9:
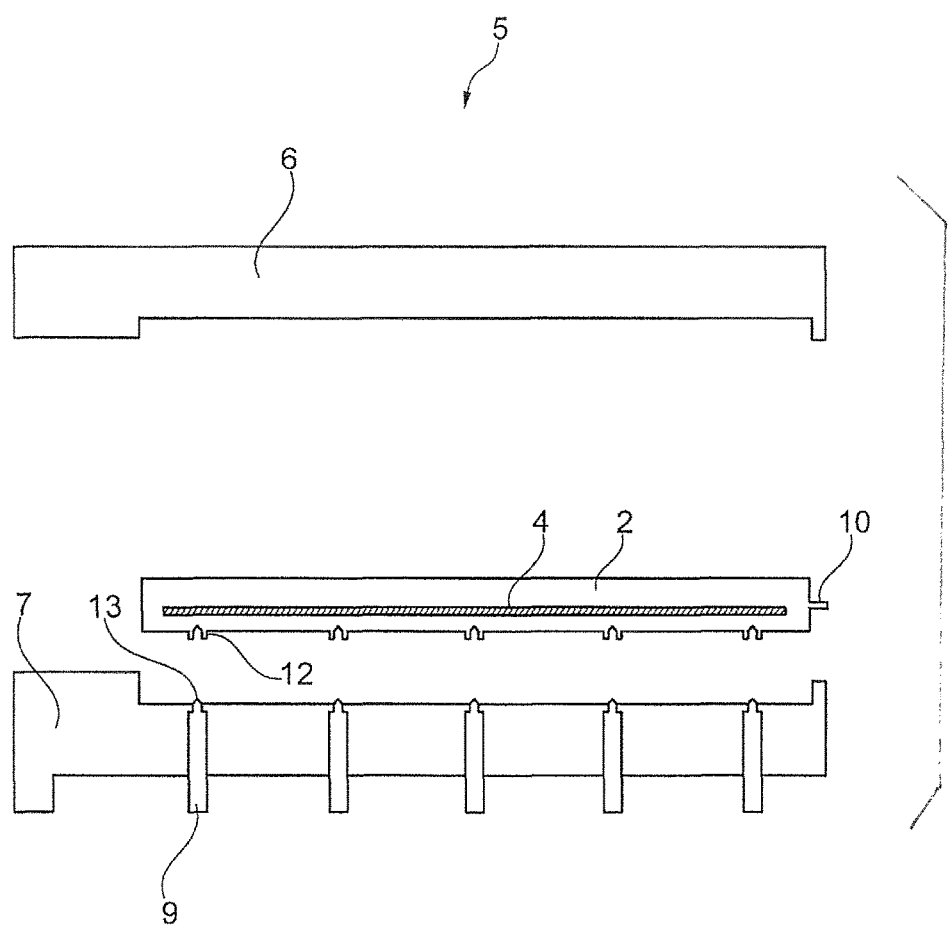
Figure 10:
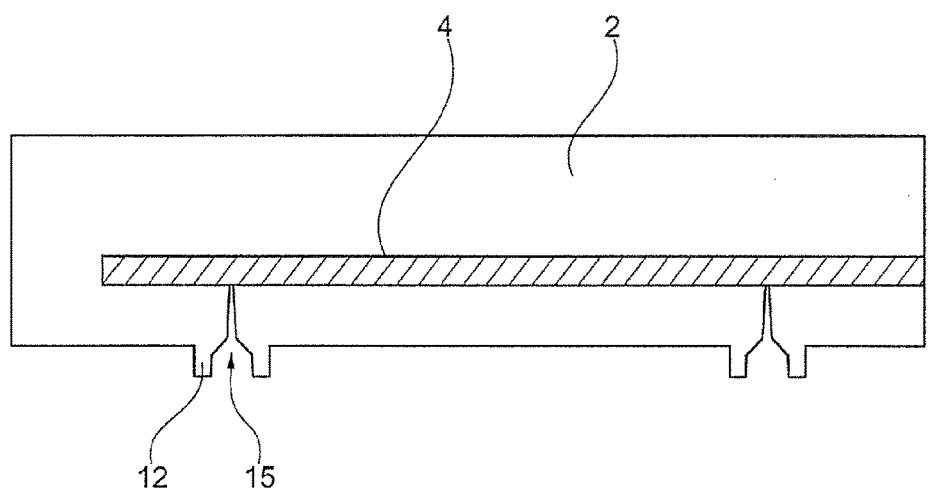
FIG. 10 shows a cutout from the subassembly as shown in FIG. 1 according to the prior art.

As can be seen in FIG. 4, first the element 4 is placed into the open injection mold 5, which consists of an upper part 6 and a lower part 7 and has a cavity 8. The element 4 is fixed in the cavity 8 by means of a movable retaining pin 9. In the present case, the element 4 is fixed by means of multiple retaining pins 9. It goes without saying that, instead of a pin-shaped retaining pin 9, a holding element of some other suitable form may also serve for the fixing of the element 4. After that, the injection mold 5 is closed and the plastic is injected into the cavity 8 at the gate 10, as is shown in FIG. 5. After filling of the cavity 8 and while the plastic is still in a plastic state, the retaining pin 9 is then moved away from the element 4 into a position $P_1$, as can be seen from FIG. 6, so that a certain volume 11 is vacated in the region of the fixing of the retaining pin 9. As shown in FIG. 7, this then allows plastic to subsequently flow into the volume 11 vacated by the retaining pin 9, a kind of joint line 12 (see FIG. 9) being produced in the region of the fixing on the body 2. Subsequently, the retaining pin 9 is then moved back again in the direction of the element 4 into a position $P_2$ while the plastic that has subsequently flowed into the volume 11 is still in a plastic state, as can be seen in FIG. 8. This moving of the retaining pin 9 back in the direction of the element 4 brings about a kind of compression of the plastic in the region of the fixing on the body 2, and in particular in the region of the joint line 12. This has the effect of producing an impermeable, closed joint line 12, as can be seen from FIG. 9, whereby permeable locations at the joint line 12 with respect to the element 4 are closed. After solidification of the plastic, the retaining pins 9 are then moved away from the element 4, so that the retaining pins 9 are located in the lower part 7 of the injection mold 5. Finally, as shown in FIG. 9, the injection mold 5 is then opened and the body 2 with the injection-molded element 4 is removed.

As can be seen by comparison of the position $P_1$ in FIG. 7 with the position $P_2$ in FIG. 8, the length of travel for the movement of the retaining pin 9 back in the direction of the element 4 is chosen to be less than the length of travel for the movement of the retaining pin 9 away from the element 4. As a result, the movement back of the retaining pin 9 is ended before or when the region of the fixing on the body 2 is reached. This ensures optimum compression of the joint line 12, without the risk of it being harmed while the pin is moving back.

Figures 2, 3:
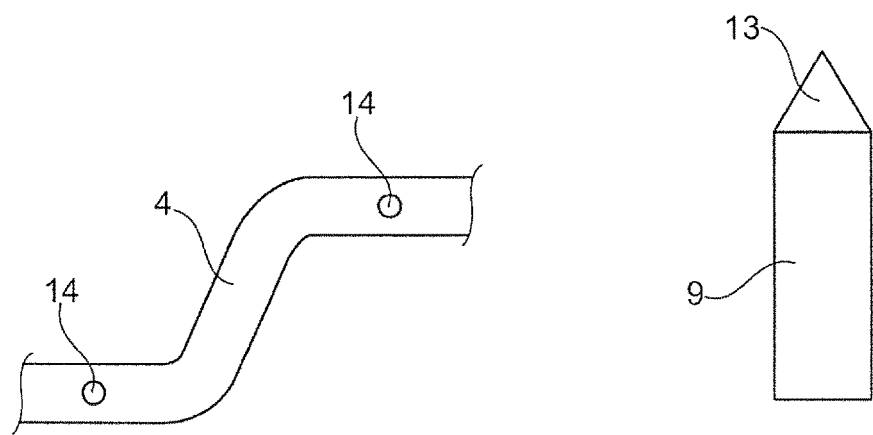
FIG. 2 shows an element of the subassembly from FIG. 1 as a detail.
FIG. 3 shows a retaining pin for fixing the element from FIG. 2 in an injection mold.

If the element 4 serves as an electrical conductor track, it is appropriate that the element 4 is a metal part. As shown in FIG. 2, the element 4 is of a flat form. In order to encapsulate multiple conductor tracks in a simple way, it is appropriate that the element 4 is formed in the manner of a leadframe, which is produced in a stamping process from a metal sheet. The plastic that is used for encapsulating the element 4 is a thermoplastic.

As can be seen in FIG. 3, the retaining pin 9 has a tip 13 for the fixing of the element 4. As shown in FIG. 2, the element 4 is in turn provided with a receptacle 14 corresponding to the tip 13. The receptacle 14 is arranged in and/or at the region of the fixing on the body 2. For fixing the element 4, the tip 13 then engages in the receptacle 14 in an interlocking and/or frictionally engaging manner, as can be seen from FIG. 4. In order to be able to carry out the corresponding movements, the retaining pin 9 is movably guided in the injection mold 5, to be precise in the lower part 7 of the injection mold 5. The retaining pin is moved by means of a drive that is not shown any further, is operated by a control and may for example work in a motorized, electromotive, electromagnetic, pneumatic, hydraulic or similar manner. As a result, the retaining pin 9 can be moved into the cavity 8 and/or out of the cavity 8 in a corresponding way.

With the aid of the method described, the subassembly 1 shown in FIG. 1, which is designed in the manner of an electrical component carrier and comprises a body 2 of plastic and at least one element 4 embedded in the body 2 by encapsulation, can consequently be produced in a sealed type of construction, the element 4 being fixed by means of a movable retaining pin 9 during the encapsulation with the plastic. For this purpose, the plastic that has subsequently flowed into the region of the fixing on the body 2 during and/or after the moving away of the retaining pin 9 is then expediently compressed by moving the retaining pin 9 back in the direction of the body 2 and the element 4.

The invention is not restricted to the exemplary embodiment described and presented. Rather, it also comprises all developments by a person skilled in the art within the scope of the invention defined by the patent claims. Thus, the method according to the invention can not only serve for producing an electrical component carrier but also be advantageously used for the media-impermeable encapsulation of other elements.

LIST OF DESIGNATIONS

1: subassembly
2: body
3: (electrical/electronic) component
4: element
5: injection mold
6: upper part (of injection mold)
7: lower part (of injection mold)
8: cavity
9: retaining pin
10: gate
11: (vacated) volume
12: joint line
13: tip (on retaining pin)
14: receptacle (in element)
15: permeable location (in the prior art)

The invention claimed is:

1. A method for encapsulating an element in a body of plastic, comprising:
   placing the element into an injection mold that has a cavity, the element being fixed in the cavity by means of a movable retaining pin;
   injecting a plastic into the cavity;
   moving the retaining pin away from the element after filling the cavity with the plastic while the plastic is still in a plastic state in such a way that the plastic thereby flows into a volume vacated by the retaining pin, and
   moving back the retaining pin in a direction of the element while the plastic that has flowed into the volume is still in a plastic state in such a way that a compression of the plastic takes place in a fixing region on the body.

2. The method for encapsulating according to claim 1, wherein during the flowing of the plastic into the volume vacated by the retaining pin, a joint line is produced in the fixing region on the body, and the plastic in the region of the joint line is compressed during the moving back of the retaining pin in the direction of the element such that permeable locations at the joint line with respect to the element are closed.

3. The method for encapsulating according to claim 1, wherein a length of travel of the moving back of the retaining pin in the direction of the element is less than a length of travel of the moving of the retaining pin away from the element.

4. The method for encapsulating according to claim 1, wherein the element is a metal part.

5. The method for encapsulating according to claim 1, wherein the plastic is a thermoplastic.

6. The method for encapsulating according to claim 1, wherein the retaining pin further comprises a tip for fixing the element.

7. The method for encapsulating according to claim 1, wherein the retaining pin is movably guided in the injection mold in such a way that the retaining pin is movable into the cavity and/or out of the cavity.

8. The method for encapsulating according to claim 3, wherein the moving back of the retaining pin is stopped before the retaining pin reaches the fixing region on the body or when the retaining pin reaches the fixing region on the body.

9. The method for encapsulating according to claim 4, wherein the element has a flat form.

10. The method for encapsulating according to claim 9, wherein the element forms a conductor track.

11. The method for encapsulating according to claim 10, wherein the element is a leadframe.

12. The method for encapsulating according to claim 6, the element further comprising at least one receptacle that is arranged to correspond to the tip of the retaining pin in or at the fixing region on the body.

13. The method for encapsulating according to claim 12, further comprising engaging the tip of the retaining pin for fixing the element in the at least one receptacle in one of an interlocking and frictionally engaging manner.

14. The method for encapsulating according to claim 7, wherein the retaining pin is moved by means of a drive.

15. The method for encapsulating according to claim 14, wherein the drive is one of a motorized drive, an electromotive drive, an electromagnetic drive, a pneumatic drive, and a hydraulic drive.

16. The method for encapsulating according to claim 15, wherein the drive further comprises means of a control for the drive.

* * * * *